United States Patent [19]

Knobbe et al.

[11] Patent Number: 5,396,326
[45] Date of Patent: Mar. 7, 1995

[54] TWO GIMBAL ERROR AVERAGING ASTRO-INERTIAL NAVIGATOR

[75] Inventors: Edward J. Knobbe, Huntington Beach; Carl L. Bose, Rancho Palos Verdes, both of Calif.

[73] Assignee: Northrop Grumman Corporation, Los Angeles

[21] Appl. No.: 333,382

[22] Filed: Apr. 3, 1989

[51] Int. Cl.$^6$ ............... G02B 27/32; G01B 11/26; G01C 19/00
[52] U.S. Cl. .................. 356/255; 33/321; 33/326; 356/139.01; 356/139.03
[58] Field of Search .......... 356/141, 152, 255, 139.01, 356/139.03; 33/320, 321, 324, 326; 73/514, 517 A

[56] References Cited

U.S. PATENT DOCUMENTS

| | | |
|---|---|---|
| 3,147,626 | 9/1964 | Fischer et al. . |
| 3,258,977 | 7/1966 | Hoffman . |
| 3,269,195 | 8/1966 | Cahoon et al. . |
| 3,320,819 | 5/1967 | Riordan et al. . |
| 3,349,630 | 10/1967 | Seliger et al. . |
| 3,391,568 | 7/1968 | Dozier . |
| 3,456,513 | 7/1969 | Emerson . |
| 3,491,228 | 1/1970 | Selvin . |
| 3,517,563 | 6/1970 | Will . |
| 3,731,544 | 5/1973 | Acker et al. . |
| 3,875,488 | 4/1975 | Crocker et al. . |
| 4,123,849 | 11/1978 | Maughmer ............... 33/320 |
| 4,159,419 | 6/1979 | Wittke ............... 356/255 |
| 4,168,524 | 9/1979 | Soltz et al. . |
| 4,292,854 | 10/1981 | Leibing . |
| 4,442,723 | 4/1984 | Auer . |

Primary Examiner—Stephen C. Buczinski
Attorney, Agent, or Firm—Terry J. Anderson; Karl J. Hoch, Jr.

[57] ABSTRACT

A strapped down astro-inertial navigator includes a roll outer gimbal, a pitch inner gimbal and a platform coupled to the inner gimbal. An instrument cluster which includes X-axis, Y-axis and Z-axis ring laser gyros (RLGs) and associated accelerometers is mounted to the platform. Also hard mounted to the platform is a stellar sensor which includes a telescope and a solid state focal plane array which views stellar reference objects. In an astro-inertial mode of operation one or more stellar objects are tracked for a period of time. The roll and the pitch gimbals are employed to point the telescope and, periodically, to observe and average out the effects of star sensor and horizontal accelerometer errors. The star sensor error observability is accomplished by periodically rotating the inner and outer gimbals through 180° and the stellar objects once again tracked. Due to the 180° rotation boresight errors within the stellar tracker are observed and compensated for. The 180° rotation also serves to reorient the accelerometer input axes by 180°, thereby also beneficially causing accelerometer errors to average out. In a free inertial mode of operation the inner and outer gimbals are both continuously rotated through plus and minus 360° but at different rotational rates to provide 3 axis error averaging of both gyro and accelerometer errors.

18 Claims, 1 Drawing Sheet

TWO GIMBAL ERROR AVERAGING ASTRO-INERTIAL NAVIGATOR

FIELD OF THE INVENTION

This invention relates generally to high precision, self-contained inertial navigation and, in particular, it relates to a strapped-down astro-inertial navigator having an inertial measurement unit (IMU) which includes only two gimbals, or two degrees-of-freedom (2 DOF). A stellar sensor is hard mounted, or strapped down, to an instrument cluster of the IMU; the optical axis of the telescope being aligned to be nominally colinear with the strap-down axis of the IMU. During astro-inertial navigation the two gimbals are used to both point the star sensor telescope and to improve navigation accuracy by providing telescope line-of-sight error observability and by averaging out the effects of horizontal accelerometer errors. During free inertial, or pure inertial, navigation, the two gimbals are used to improve navigation accuracy through the use of 3-axis error averaging of both gyro and accelerometer errors.

BACKGROUND OF THE INVENTION

Stabilized inertial navigation apparatus, such as that employed for self contained, high precision airborne applications, typically include a platform whereon a number of gyroscopes and accelerometers are mounted and three or more gimbals are required for stabilizing the platform. For a pure inertial or free inertial navigator the dominant source of navigation error is the gyro drift or platform reference drift error. Since the platform provides an inertial reference, this drift can be substantially eliminated by tracking stellar objects. Consequently, for astro-inertial operation, additional apparatus may include a telescope and an imager, such as a vidicon tube, for imaging and tracking stellar objects such as stars. Also, two or more gimbals, typically azimuth and elevation, are required to point the telescope. During astro-inertial navigation, the dominant sources of navigation error are horizontal accelerometer errors and gravity anomalies. Gravity modeling, for high precision astro-inertial navigation, has reduced these errors to be consistent with high precision accelerometer performance.

Several problems associated with conventional high accuracy, free inertial navigators include: a) excessive size and cost due to the three or gimbals required to stabilize the instrument cluster and, b) a relatively large position error growth which is typically greater than 0.2 nautical mile per hour.

Several problems associated with conventional high accuracy astro-inertial navigators include: a) excessive size and cost due to the number of gimbals required to stabilize the instrument cluster and to point the telescope and b) the cost of the ultra-high precision (arc second) -resolvers, and their associated calibration requirements, which are required to transform the star line, or telescope line-of-sight, measurements to the inertially stabilized instrument cluster.

Additionally, airborne stabilized platforms require the use of gimbal slip rings which increase system cost and complexity and reduce system reliability.

SUMMARY OF THE INVENTION

The foregoing problems are overcome and other advantages are realized by an astro-inertial navigator constructed and operated in accordance with the invention. In an illustrative embodiment of the invention there is disclosed an astro-inertial navigator which-includes a roll outer gimbal, a pitch inner gimbal and a platform coupled to the inner gimbal and a platform cluster which includes X-axis, Y-axis and Z-axis ring laser gyros (RLGs) and associated accelerometers mounted to the platform. Also hard mounted to the platform is a stellar sensor which includes a solid state imaging device which views stellar reference objects through a telescope. The use of the ring laser gyros, with their high dynamic capability and negligible acceleration sensitive drifts, and the solid-state star sensor, with its focal plane array, eliminates the requirement for providing a stabilized platform for high accuracy astro-inertial navigation.

The astro-inertial navigator of the invention operates in one of two modes. In an astro-inertial mode one or more stellar objects are periodically tracked. The roll and the pitch gimbals are employed to point the telescope and thereby track stars. Periodically, the pitch and roll gimbals are rapidly, and simultaneously, rotated through ±180 degree angles and stars again tracked in the new orientation. These periodic ±180 degree pitch and roll rotations effectively rotate the instrument cluster through azimuth angles of ±180 degrees. These rotations have the effect of a) providing greater observability for in-flight estimation and compensation of telescope line-of-sight errors and b) averaging out navigation errors due to horizontal accelerometer errors. Thus, less precise star sensor and accelerometers are required. The limited freedom of motion of the gimbals eliminates the need for slip rings. The nonstabilized platform requires the use of only two gimbals. And, inasmuch as the stellar sensor is mounted directly (or hard mounted) on the instrument cluster, the requirement for precision telescope resolvers is also eliminated.

In a free inertial mode, the inner and outer gimbals are both continuously rotated through plus and minus 360 degree rotations, each gimbal have ±180 degrees of freedom. The inner gimbal rotational rate is approximately an order of magnitude higher than that of the outer gimbal to provide enhanced error averaging. Thus, navigation errors which result from gyro and accelerometer errors are continuously cancelled resulting in a position error growth which is a function of the square root of time instead of the linear error growth which is associated with conventional free inertial navigators. In the free inertial mode, the dominant error source is the angle random walk of the RLGs which does not average out. Using currently available RLGs free inertial navigation accuracies of better than 0.05 nmi/$\sqrt{hr}$ are readily achievable.

BRIEF DESCRIPTION OF THE DRAWINGS

These and other aspects of the invention will be made more apparent in the following Detailed Description of the Invention read in conjunction with the accompanying Drawing wherein.

DETAILED DESCRIPTION OF THE INVENTION

Figure 1:
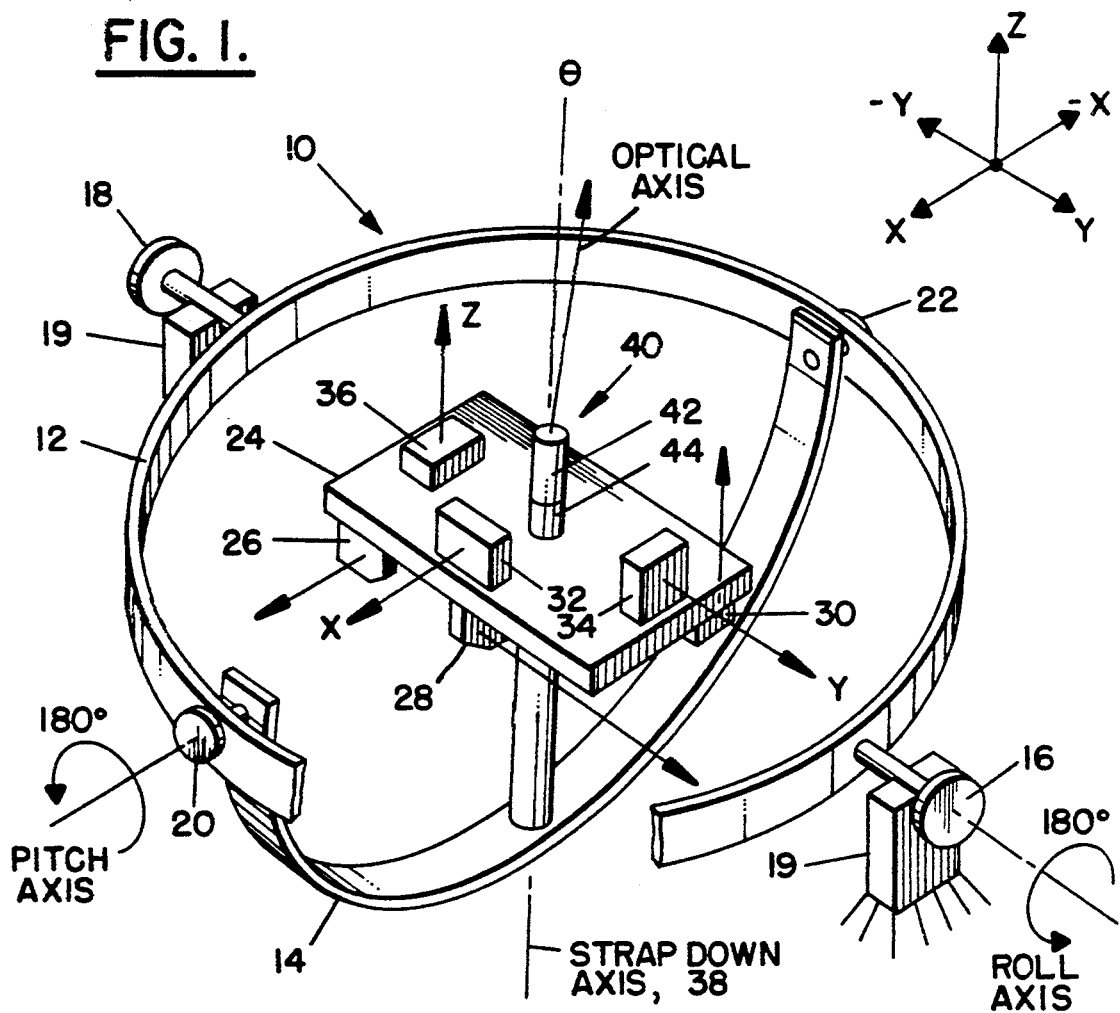
FIG. 1 shows partly in block diagram form a two gimbal astro-inertial navigator in a first orientation.

Referring now to FIG. 1 there is shown an illustrative view of an astro-inertial navigator 10 constructed in accordance with the invention. Navigator 10 comprises an outer roll gimbal 12 and an inner pitch gimbal 14. Coupled to roll gimbal 12 along a roll axis is a roll gimbal torque motor 16 and a roll gimbal resolver 18. Roll gimbal 12 rotates relative to a frame 19. Pitch gimbal 14 is rotatably coupled to roll gimbal 12 along a pitch axis by a pitch gimbal torque motor 20. A pitch gimbal resolver 22 is also disposed along the pitch axis. Roll and pitch gimbals 12 and 14 are rotated about their respective axis by the operation of their respective torque motors 16 and 20. These torque motors are energized and controlled by closed loop control mechanisms (not shown) of a type known in the art. The rotation of gimbals 12 and 14 about their respective axis is accomplished in part to rotate a platform 24 for telescope pointing and for error averaging. In order to maintain an inertial reference the platform 24 has mounted thereto an instrument cluster which includes an X-axis gyroscope 26, a Y-axis gyroscope 28 and a Z-axis gyroscope 30. Linear motion of the platform is sensed by an X-axis accelerometer 32, a Y-axis accelerometer 34 and a Z-axis accelerometer 36. Signals generated by the gyroscopes 26–30 and accelerometers 32–36 are provided to known types of signal processing circuitry (not shown) whereby navigation position information is maintained and updated during the movement of the navigator 10. Such signal processing circuitry is operable for executing known strapdown navigation algorithms.

Platform 24 is mounted, or strapped down, to pitch gimbal 14 along a strap down axis 38. Also mounted to platform 24 is a stellar sensor 40 which includes a telescope 42 and an imager 44. An optical axis of the tracker 40 is, ideally, colinear with the strap down axis 38. However, due to misalignment the optical axis may be offset from the strap down axis 38 by some angle theta. As will be shown, this angular misalignment, or boresight error, is one type of error which is compensated for by the navigator 10 of the invention.

Although the invention may be realized with a number of different types of components, in a presently preferred embodiment of the invention the gyros 26–30 are ring laser gyros each having an optical path length of 20 centimeters. The gyros have a pentagonal shape and are mechanically dithered. The angle of random walk of the gyros is preferably equal to or less than $4 \times 10^{-4}$ degrees/$\sqrt{HR}$. Accelerometers 32–36 may be a pendulous type having an acceleration random walk preferably equal to or less than 0.5 $\mu g/\sqrt{HR}$. The tracker 40 preferably comprises a hard mounted solid state imager, such as a charge coupled device (CCD)/telescope or charge injection device (CID)/telescope combination. A solid state imaging device is preferred to a vidicon device in that a solid state device is inherently more rugged. Also, with a solid state imaging device so long as the object of interest, such as a star, is within the sensor field of view precise angular measurement of the object may be accomplished electronically by processing pixel outputs. Thus, precise absolute pointing is not required as is the case with conventional star trackers. As to the gimbal structure itself the pitch inner gimbal 14 and the roll outer gimbal 12 have a rotational freedom of plus or minus 180° and a rotational rate capability of at least 20 degrees/sec.

Figure 2:
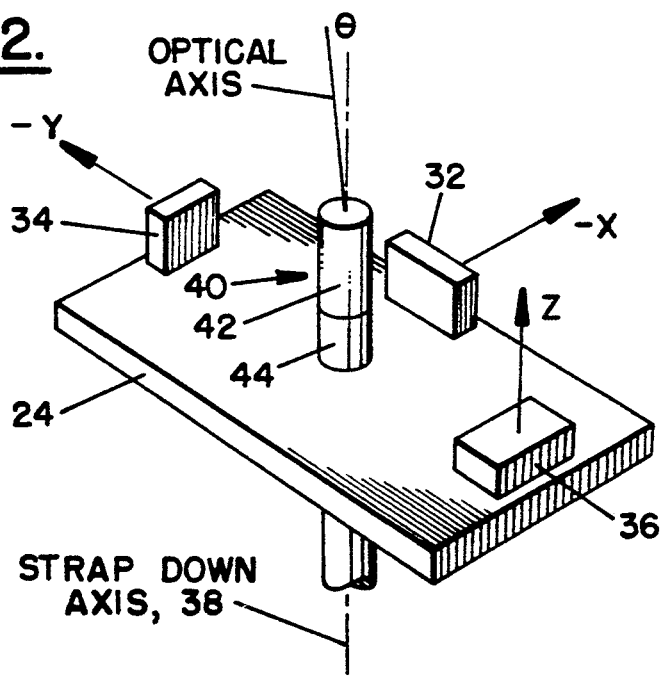
FIG. 2 shows the stabilized platform of the astro-inertial navigator of FIG. 1 in a second orientation which is rotated by 180° about the strapdown axis.

Referring now to FIG. 2 it can be seen that a 180° rotation of the roll gimbal 12 and the pitch gimbal 14, in the direction of the arrows designated as A in FIG. 1, results in the platform 24 being oriented as shown, i.e., a 180° rotation about the strapdown axis. In FIG. 2 the input axis of each of the accelerometers is reversed by 180° Furthermore, it can be seen that the optical axis associated with the stellar tracker 40, more specifically the misalignment angle theta, is also reversed by an equal and opposite amount. As a result of this reorientation of platform 24 those constant errors which are fixed in the instrument cluster coordinate system are completely averaged out in navigation coordinates. That is, an error component in the X accelerometer 32 and the Y accelerometer 34 output signals will appear having an equal magnitude and an opposite sign. Furthermore, the angular misalignment between the optical axis and the strap down axis 38 will also appear to be equal and opposite.

In the astro-inertial mode of navigation the platform may be oriented as shown in FIG. 1 while one or more stellar objects are tracked for some predetermined amount of time, such as 300 seconds. The roll and the pitch gimbals are employed to point the stellar imager and to average out the effects of horizontal accelerometer errors. Thereafter, the gimbals 12 and 14 are each rotated 180° in, for example, six seconds by their respective torque motors to reorient the platform as shown in FIG. 2. Stellar objects are then once more tracked for the predetermined amount of time. Thereafter, the gimbals 12 and 14 are periodically rotated back and forth through 180° such that the platform 24 is alternatively oriented as shown in FIGS. 1 and 2 and the stellar tracking operation is again commenced following each rotation. During the tracking of stellar objects, for the configurations shown in FIGS. 1 and 2, the input axes of the X and Y accelerometers 32 and 34 are alternately colinear, for approximately equal durations of time, with the $+X,-X$ and $+Y,-Y$ axes, respectively. Therefore, over a period of time the error outputs from the accelerometers will be alternately positive and negative. This results in fixed errors in the accelerometers to be effectively averaged out resulting in an improvement in navigational accuracy. Furthermore, since the accelerometer errors are effectively averaged out, less precise accelerometers may be employed in order to achieve a high degree of navigational accuracy.

In addition, any angular misalignment between a predicted position of a stellar object and an actual observed position of the object may be readily differentiated into a first component due to the actual position error of the platform 24 and a second component due to the boresight error of the tracker 40. In that boresight error will be characterized as a positive and a negative angular misalignment, depending on the orientation of the platform, this boresight component is readily observed and compensated for. Also, in that the stellar tracker 40 is mounted to the platform 24 there is no requirement that a transformation of coordinates be accomplished between the tracker coordinate system and the platform coordinate system. Therefore, the resolvers 18 and 22 are not required to be high precision resolvers having arc-second accuracy, but rather having arc-minute accuracy.

In the aforementioned free inertial navigation mode the inner pitch gimbal 14 is preferably rotated through 360° in approximately 60 seconds (6°/sec.). The outer roll gimbal 12 is simultaneously rotated through 360° in approximately 600 seconds (0.6°/sec.). The continuous back and forth rotation of these two gimbals through 360° has been found to be essentially equivalent to three axes carouselling of a conventional three gimballed system and, in addition, cancels out the error effects of gyro input axis compliances.

The position error growth characteristic of the astro-inertial navigator 10 of the invention has been found, in the free inertial mode, to be approximately 0.05 nautical miles/$\sqrt{HR}$ this error being dominated by the ring laser gyro angle random walk. The position error growth rate of the two-degree of freedom astro-inertial navigator 10, in the free inertial mode, beneficially increases only as a square root of time as opposed to the linear error growth rate of a conventional free inertial strapdown navigator or of an inertially stabilized conventional three or more degree of freedom navigator. In the astro-inertial mode the position error growth characteristic has been found to be approximately 0.008 nautical miles/$\sqrt{HR}$ this error being dominated by accelerometer and residual gravity anomaly errors.

Obviously many modifications and changes may be made to the foregoing description without departing from the spirit of the invention. For example, although the invention has been described in the context of a two gimbal system wherein each gimbal has a rotational freedom which is limited to plus or minus 180° it is within the scope of the invention to freely rotate each gimbal through more than 360°. Of course, slip rings or some other suitable electrical coupler may be required if the gimbals are freely rotated. Furthermore, although the invention has been disclosed in the context of a mechanically dithered RLG it should be realized other suitable types of laser gyros are useable by the system of the invention. Thus, it is intended that the scope of the invention be determined solely on the claims appended hereto.

What is claimed is:

1. A two gimbal inertial navigation apparatus comprising:
    a first gimbal mounted for rotation about a first axis,
    means for rotating said first gimbal through at least 360° about said first axis,
    a second gimbal mounted for rotation on said first gimbal about a second axis perpendicular to said first axis,
    a platform rigidly coupled to said second gimbal along a strapdown axis which is substantially perpendicular to said platform, and
    an instrument cluster for sensing accelerations along an X-axis, a Y-axis and a Z-axis, said instrument cluster being coupled to said platform, said instrument cluster comprising:
    an X-axis gyroscope,
    a Y-axis gyroscope,
    a Z-axis gyroscope,
    an X-axis accelerometer,
    a Y-axis accelerometer,
    a Z-axis accelerometer;
    means for compensating for navigation errors resulting from gyro and accelerometer errors during free inertial navigation by rotating said two gimbals, and
    means for performing three axis gyro and accelerometer error averaging based on data from rotating said two gimbals.

2. Inertial navigation apparatus as defined in claim 1 and further comprising means for imaging stellar objects, said imaging means being coupled to said platform and having an optical axis substantially parallel to said strapdown axis.

3. Inertial navigation apparatus as defined in claim 2 wherein said means for imaging stellar objects comprises a solid state imaging device.

4. Inertial navigation apparatus as defined in claim 3 wherein said means for imaging stellar objects comprises a CCD or a CID imager.

5. Inertial navigation apparatus as defined in claim 1 wherein said X-axis gyroscope, said Y-axis gyroscope and said Z-axis gyroscope are each a laser gyroscope.

6. A two gimbal strapdown astro-inertial navigator comprising
    a roll axis gimbal coupled to a roll gimbal torque motor for rotating said roll axis gimbal through at least 360°,
    a pitch axis gimbal coupled to said roll axis gimbal and also coupled to a pitch gimbal torque motor for rotating said pitch axis gimbal through at least 360°,
    a platform coupled to said pitch axis gimbal along a strapdown axis, said strapdown axis being substantially perpendicular to said platform,
    an instrument cluster coupled to said platform, said instrument cluster comprising
    an X-axis laser gyroscope,
    a Y-axis laser gyroscope,
    a Z-axis laser gyroscope,
    an X-axis accelerometer,
    a Y-axis accelerometer,
    a Z-axis accelerometer
    said instrument cluster further comprising solid state imaging means for imaging stellar objects, said solid state imaging means having an optical axis which is substantially colinear with said strapdown axis,
    means for compensating for navigation errors resulting from gyro and accelerometer errors during free inertial navigation by rotating said two gimbals, and
    means for performing three axis gyro and accelerometer error averaging based on data from rotating said two gimbals.

7. An astro-inertial navigator as set forth in claim 6 and further comprising:
    a roll resolver coupled to said roll axis gimbal for indicating an amount of rotation of said roll axis gimbal about a roll axis; and
    a pitch resolver coupled to said pitch axis gimbal for indicating an amount of rotation of said pitch axis gimbal about a pitch axis.

8. An astro-inertial navigator as set forth in claim 6 wherein said solid state imaging means comprises a CCD or a CID imager optically coupled to a telescope.

9. A method, while star tracking, of substantially cancelling fixed errors of an X-axis accelerometer and a Y-axis accelerometer both of which are coupled to a platform, comprising the steps of:
    orienting the platform in space such that an input axis of the X-axis accelerometer points along an X-axis and an input axis of the Y-axis accelerometer points along a Y-axis;
    operating the X-axis accelerometer and the Y-axis accelerometer for a first predetermined interval of time, each of the accelerometers generating an output signal which includes a first error component;

rotating the platform in space such that the input axis of the X-axis accelerometer points along the X-axis in an opposite direction and the input axis of the Y-axis accelerometer points along the Y-axis in an opposite direction;

operating the X-axis accelerometer and the Y-axis accelerometer for a second predetermined interval of time, each of the accelerometers generating an output signal which includes a second error component, the second error component having a sign opposite that of the first error component and a magnitude substantially equal to that of the first error component; and averaging the first and second error components such that a total error component over the first and the second predetermined intervals of time is substantially cancelled.

10. A method, while star tracking, of substantially compensating a boresight error of a star sensor which provides position related information to an astro-inertial navigator, the star sensor being coupled to a platform stabilized by a roll gimbal and a pitch gimbal, the platform being strapped down to the pitch gimbal along a strapdown axis which is substantially parallel with an optical axis of the star sensor, comprising the steps of:

orienting the roll gimbal and the pitch gimbal to point the star sensor optical axis at a predetermined stellar object;

determining a first angular misalignment between the optical axis and the stellar object, the first angular misalignment including a first component related to an attitude reference error of the navigator and a second component related to an angular misalignment of the optical axis relative to the strapdown axis;

rotating both the roll gimbal and the pitch gimbal by 180°; and determining a second angular misalignment between the optical axis and the stellar object, the second angular misalignment including a first component related to the attitude reference error of the navigator and a second component related to the angular misalignment of the optical axis relative to the strapdown axis, the second component after the step of rotating being of substantially equal magnitude and opposite sign to the second component before the step of rotating whereby the second component due to the angular misalignment of the optical axis relative to the strapdown axis is observed and compensated for.

11. A method of compensating for navigation errors resulting from gyro and accelerometer errors during free inertial navigation of a two gimbal inertial navigator having an instrument cluster supporting platform strapped down to an inner gimbal, comprising the steps of continuously rotating the inner gimbal through plus and minus 360° at a first rotational rate while simultaneously rotating an outer gimbal through plus and minus 360° at a second rotational rate while performing three axis gyro and accelerometer error averaging.

12. A method as set forth in claim 11 wherein the second rotational rate is approximately an order of magnitude faster than the first rotational rate.

13. A method as set forth in claim 12 wherein the the first rotational rate is approximately 6° per second and the second rotational is approximately 0.6° per second.

14. Apparatus for compensating for navigation errors resulting from gyro and accelerometer errors during free inertial navigation of a two gimbal inertial navigator having an instrument cluster supporting platform strapped down to an inner gimbal, comprising means for continuously rotating the inner gimbal through plus and minus 360° at a first rotational rate, and means for simultaneously rotating an outer gimbal through plus and minus 360° at a second rotational rate, and means for performing three axis gyro and accelerometer error averaging.

15. Apparatus as in claim 14 wherein the second rotational rate is approximately an order of magnitude faster than the first rotational rate.

16. Apparatus as in claim 14 wherein the first rotational rate is approximately 6° per second and the second rotational is approximately 0.6° per second.

17. Apparatus for substantially compensating a boresight error of a star sensor, while star tracking, which provides position related information to an astro-inertial navigator, the star sensor being coupled to a platform stabilized by a roll gimbal and a pitch gimbal, the platform being strapped down to the pitch gimbal along a strapdown axis which is substantially parallel with an optical axis of the star sensor, comprising:

means for orienting the roll gimbal and the pitch gimbal to point the star sensor optical axis at a predetermined stellar object, means for determining a first angular misalignment between the optical axis and the stellar object, the first angular misalignment including a first component related to an attitude reference error of the navigator and a second component related to an angular misalignment of the optical axis relative to the strapdown axis, means for rotating both the roll gimbal and the pitch gimbal by 180°, and means for determining a second angular misalignment between the optical axis and the stellar object, the second angular misalignment including a first component related to the attitude reference error of the navigator and a second component related to the angular misalignment of the optical axis relative to the strapdown axis, the second component after the step of rotating being of substantially equal magnitude and opposite sign to the second component before the step of rotating whereby the second component due to the angular misalignment of the optical axis relative to the strapdown axis is observed and compensated for.

18. Apparatus for substantially cancelling fixed errors of an X-axis accelerometer and a Y-axis accelerometer, while star tracking, both of said accelerometers being coupled to a platform, comprising:

means for orienting the platform in space such that an input axis of the X-axis accelerometer points along an X-axis and an input axis of the Y-axis accelerometer points along a Y-axis, means for operating the X-axis accelerometer and the Y-axis accelerometer for a first predetermined interval of time, each of the accelerometers generating an output signal which includes a first error component, means for rotating the platform in space such that the input axis of the X-axis accelerometer points along the X-axis in an opposite direction and the input axis of the Y-axis accelerometer points along the Y-axis in an opposite direction, means for operating the X-axis accelerometer and the Y-axis accelerometer for a second predetermined interval of time, each of the accelerometers generating an output signal which includes a second error component, the second error component having a sign opposite that of the first error component and a magnitude substantially equal to that of the first error component, and means for averaging the first and second error components such that a total error component over the first and the second pre-determined intervals of time is substantially cancelled.

* * * * *